United States Patent [19]

Fuller

[11] 4,126,420  
[45] Nov. 21, 1978

[54] HYDROLYSIS COLUMN FOR AN AMMONIUM DIURANATE CONVERSION LINE PROCESSING SYSTEM

[75] Inventor: Robert R. Fuller, Columbia, S.C.

[73] Assignee: Westinghouse Electric Corp., Pittsburgh, Pa.

[21] Appl. No.: 701,069

[22] Filed: Jun. 29, 1976

[51] Int. Cl.² ............... B01J 10/00; B01J 1/20; B05B 1/24; C01G 43/00

[52] U.S. Cl. .................... 422/162; 55/222; 239/110; 239/132.1; 423/253; 422/234

[58] Field of Search ........... 23/252 A, 261, 283; 239/110, 128, 132.1, 134, 135, 139; 423/15, 253 (U.S. only); 55/222

[56] References Cited

U.S. PATENT DOCUMENTS

| | | | |
|---|---|---|---|
| 368,733 | 8/1887 | Ryan | 239/110 |
| 1,949,182 | 2/1934 | Roberts | 239/110 |
| 2,098,047 | 11/1937 | Jaeger et al. | 23/283 X |
| 2,800,367 | 7/1957 | Postlewaite et al. | 239/139 |
| 2,843,217 | 7/1958 | Von Linde | 23/261 |
| 3,477,644 | 11/1969 | Bablouzian et al. | 239/135 |
| 3,816,077 | 6/1974 | Fuller et al. | 23/252 A X |
| 3,998,925 | 12/1976 | Fuller | 423/15 |

*Primary Examiner*—Morris O. Wolk  
*Assistant Examiner*—Roger F. Phillips  
*Attorney, Agent, or Firm*—J. R. Campbell

[57] ABSTRACT

A hydrolysis column, used to hydrolyze uranium hexafluoride gas with water in an ammonium diuranate conversion process, which includes a pipe having a water inlet, a connector inserted in the pipe intermediate its length, and a gas nozzle connected to the connector to feed uranium hexafluoride gas into the water. Since the uranium hexafluoride gas will freeze at 147° F, the gas nozzle is heated by steam which flows through internal passageways, thus imparting sufficient heat to the nozzle which then acts as a heat sink to maintain the gas in a fluid state. The gas-water mixture is then discharged through the pipe outlet to the next step in the process.

3 Claims, 3 Drawing Figures

HYDROLYSIS COLUMN FOR AN AMMONIUM DIURANATE CONVERSION LINE PROCESSING SYSTEM

BACKGROUND OF THE INVENTION

The invention described herein relates to nuclear fuel processing systems and more particularly to an improved nozzle used in an ammonium diuranate (ADU) conversion line processing system. An ADU conversion process utilizes a packed column to hydrolize uranium hexafluoride gas with water to produce a uranyl fluoride solution containing hydrofluoric acid which subsequently is treated to extract uranium from the solution. In this kind of process, water admitted at the top of a column and gas into a side thereof mix to form a solution which eventually is discharged from the bottom of the column. Since the uranium hexafluoride gas will solidify or freeze at temperatures below about 147° F., it is necessary that heat be imparted to a nozzle attached to the housing through which the gas flows to prevent such solidification during system operation, and particularly when the system is shut down for repairs or other purposes.

One design of gas nozzle used for this purpose includes a pair of concentrically disposed pipes secured at their midpoint to the column. The inner concentric pipe located outside the column is adapted for connection to a source of uranium hexafluoride gas which flows through the inner pipe into the column to be mixed with the water therein. The space between the concentric pipes carries steam which imparts its heat by conduction through the pipe walls to the gas to help assure maintaining the gas in a fluid state. The section of concentric pipes located inside the column turn downwardly toward the column bottom so that both gas and steam flowing through the pipes discharges from the nozzle end along the column axis.

The major disadvantage encountered in this nozzle design is that variation in steam flow occasionally permits the small sections of the nozzle pipes to drop below the gas freezing temperature. This action allows the uranium hexafluoride gas to freeze or solidify at different points along the pipe length and especially near the exit end thereof, thus causing plugging along the pipe length. Further, fluoride in the uranium hexafluoride gas forms hydrogen fluoride gas during the reaction which occurs when the gas comes in contact with moisture in the pipe. This further action corrodes the nozzle to such a great extent that the expected life is approximately two to three weeks, even though the pipe is constructed of stainless steel or other corrosion resistant materials of construction. Also, since the condition of the nozzle would cause steam flow to vary, the variation was suspected of causing detrimental effects to the uranium dioxide powder produced in the system.

SUMMARY OF THE INVENTION

Briefly stated, the above disadvantages of the prior art are overcome by providing an improved design of nozzle, which includes a housing adapted for connection to the column and having bored passageways therein for accommodating flow of uranium hexafluoride gas from a supply source into the column. The housing further is provided with passageways for steam which act to impart heat to the nozzle housing, thus establishing a zone of relatively high temperature which serves to preclude the gas from freezing or solidifying during the times of system operation and when the system may be shut down for extended time periods.

It therefore is an object of the invention to provide an improved design of nozzle for a hydrolysis column which is of simple and economical design and which is effective in minimizing plugging of the passageways and minimizing contribution to impurity contamination of the uranium being processed.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings, wherein:

DESCRIPTION OF THE PREFERRED EMBODIMENT

Figure 1:
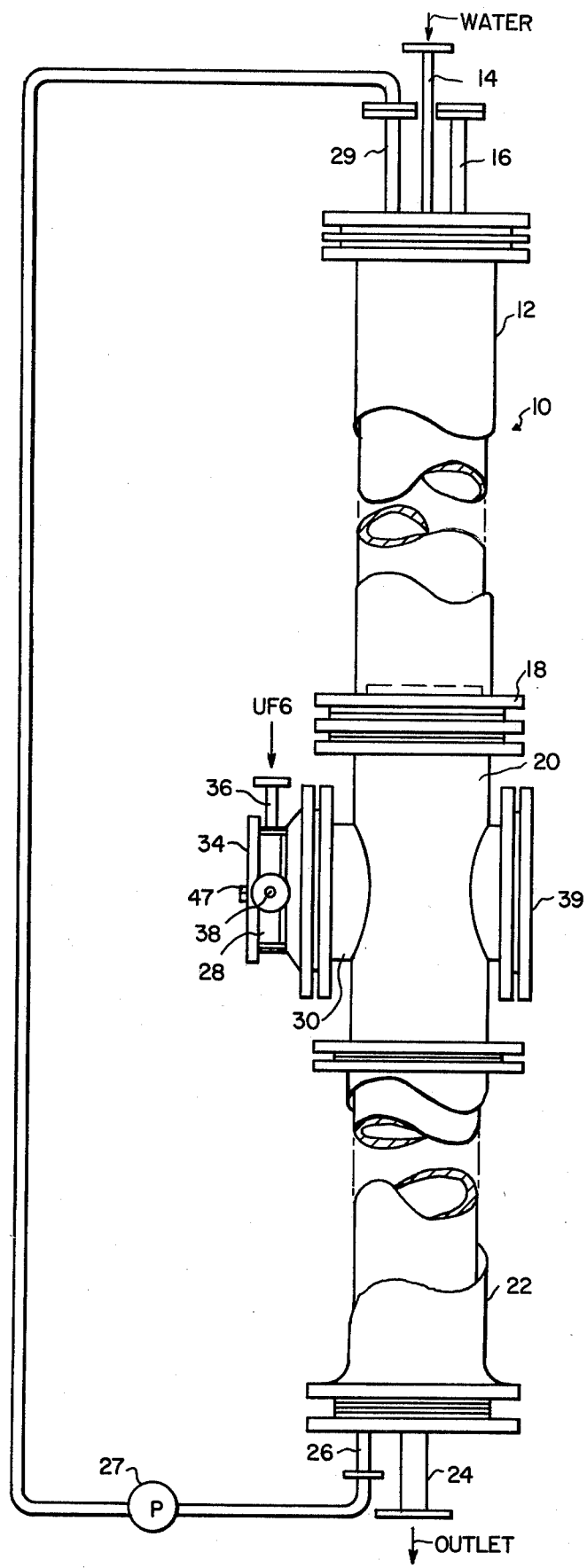
FIG. 1 is a view in elevation, partly in section, of a hydrolysis column including the improved design of nozzle attached thereto.

Referring now to the drawings wherein like reference characters designate like or corresponding parts throughout the several views, there is shown in FIG. 1 a hydrolysis column 10 adapted for connection to a uranium processing system. The column includes a pipe 12 having a water inlet 14 and air vent 16 in the upper end thereof. The lower end of pipe 12 includes a flange 18 bolted or otherwise secured to a flange cross-connector 20. The lower end of the cross-connector likewise is fixed to a pipe 22 having a discharge outlet 24 in the bottom thereof. A liquid level controller outlet 26 connected to other parts, not shown, maintains a desired level of liquid in the column and additionally provides for recirculation of a portion of column liquid from the outlet 26 via pump 27 to an inlet 29 located at the top.

The cross-connector 20 carries a gas nozzle 28 coupled to gas inlet 30 by a connector. A retainer 34 secures the nozzle to the cross-connector. Flanged pipe 36 adapted for connection to a source of uranium hexafluoride gas supplies the gas through the nozzle for delivery to the cross-connector and a steam inlet 52 supplies steam or other heated fluid to the nozzle for maintaining it at a predetermined temperature, as more fully described hereafter. Cross-connector 20 also includes an opening to accommodate reverse installation in the system, if desired, and is closed by a blank flange 39.

Figure 2:
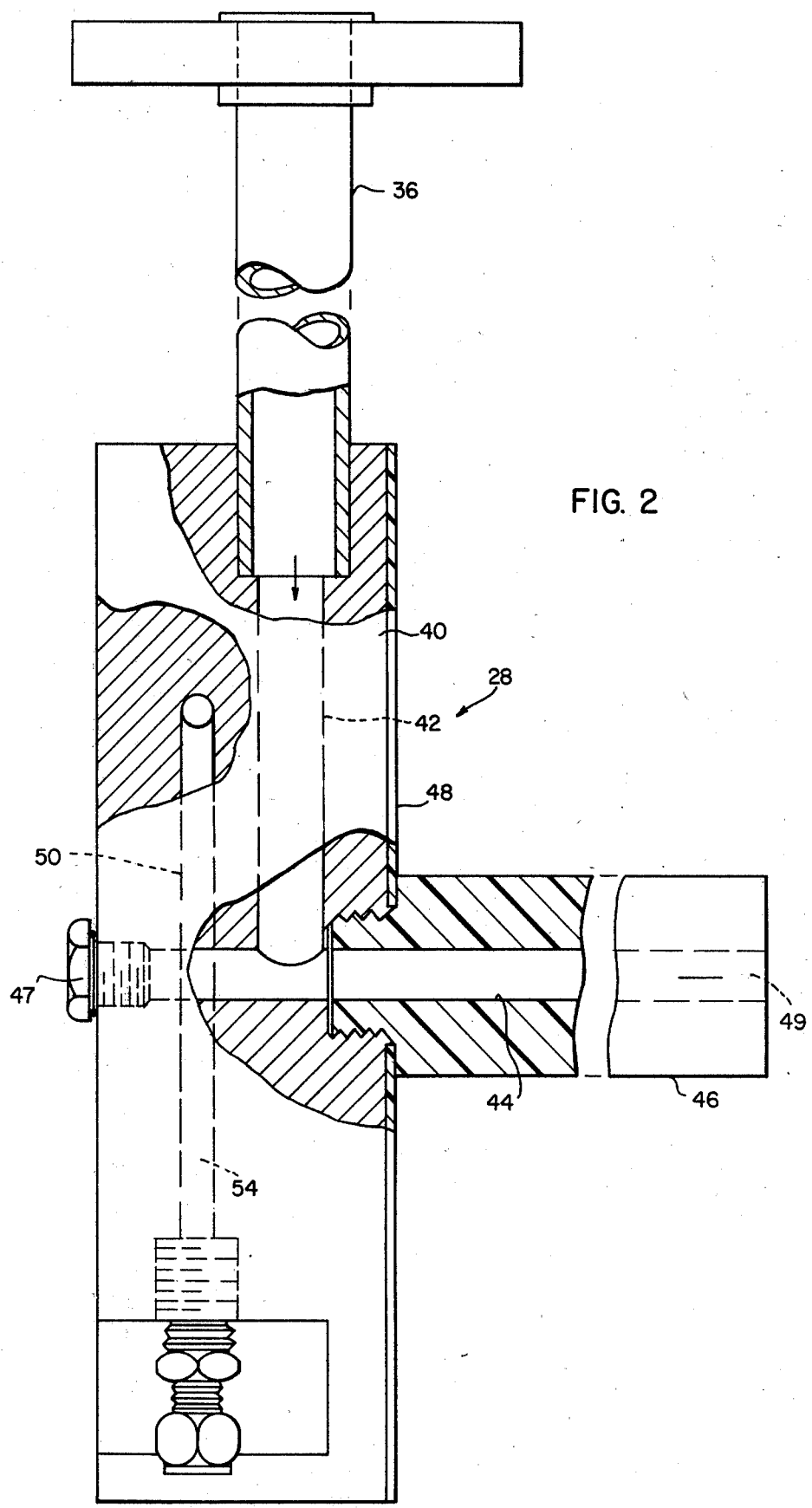
FIG. 2 is a view in elevation, partly in section, of the improved nozzle of this invention.
Figure 3:
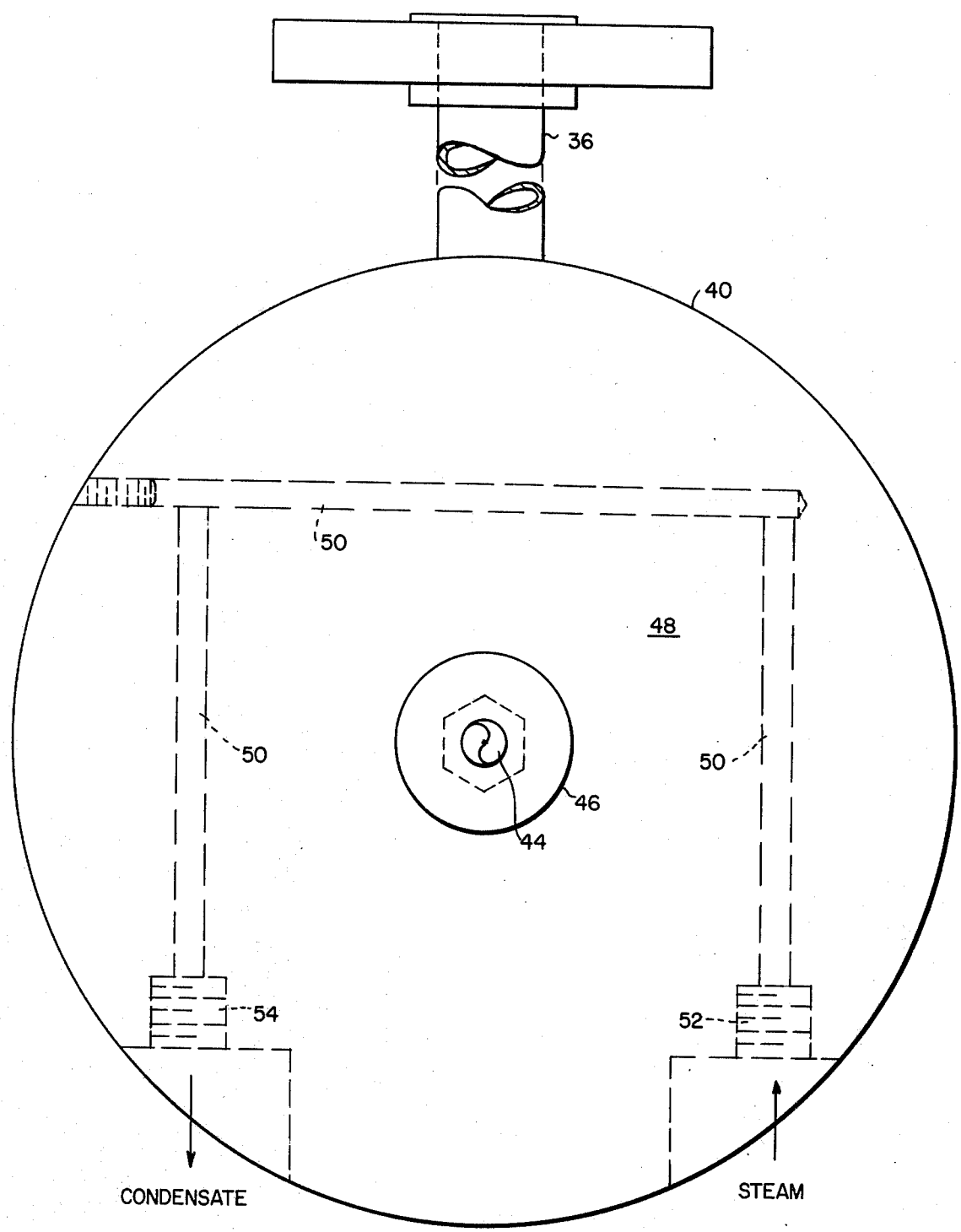
FIG. 3 is a side view of the nozzle illustrated in FIG. 2.

The nozzle design illustrated in FIGS. 2 and 3 includes a generally circular housing 40 of stainless steel having radially disposed passageways 42 which merge into a bored axial passageway 44. The stainless steel inlet pipe 36 is welded to the housing to provide a fluid-tight fit while the axial passageway is screw threaded to accept a Teflon fitting 46 which supplies gas to cross-connector 20. Plug 47 closes the axial passageway on the opposite side of the housing and upon removal, permits ready inspection of the passageways in the nozzle and serves as a clean-out area should plugging of the passageways occur. A Teflon gasket 48 is attached to the full face of housing 40.

To overcome the gas solidification problem inherent in prior art structures, a separate steam circuit is incorporated in the housing by providing communicating bores 50 shown in FIGS. 2 and 3. Both the steam inlet 52 and outlet 54 are drilled to a larger size to accept couplings adapted for connection to the steam supply source. These bored openings are in a closed circuit with the steam source and the steam flowing therein does not enter the process stream. As steam flows through these bored openings, it imparts heat by conduction to the surrounding nozzle housing and maintains the housing temperature at a level higher than the solidification or freezing temperature of the uranium hexafluoride gas flowing through the gas passageways 42. The particular benefits derived from this construction are that the hydrolysis column can be shut down for extended time periods without concern for the uranium hexafluoride gas plugging the nozzle because the steam circuit is completely independent of the process and needs only a steam source to maintain the nozzle housing at a desired temperature. Also, the independence of steam flow from the process eliminates the entry of steam and impurities possibly contained therein which otherwise adversely affects the process.

OPERATION

In operation, steam is introduced into the inlet 52 and flows in a closed loop through the bored openings 50 prior to discharge from the outlet 54. During such passage through the openings, the steam imparts heat to the nozzle housing 40 which serves as a large heat sink and steam flow continues until the temperature thereof is raised above 147° F. As indicated previously, uranium hexafluoride gas will freeze or solidify at a temperature below 147° F. However, with the complete nozzle housing at a temperature greater than 147° F., freezing of the gas accordingly will not take place.

As water is introduced through the inlet 14 and flows downwardly through pipe 12 into the cross-connector 20, it is contacted by the uranium hexafluoride gas flowing through outlet 49 and promptly mixes with the water to produce uranyl fluoride solution containing hydrofluoric acid. This solution is discharged through the hydrolysis column outlet 24 and supplied to other parts of the system where it is subsequently treated.

In the event it is desired to shut down the system for any reason, the flow of steam is continued through the bored openings 50 to maintain the nozzle housing at a temperature greater than 147° F. By doing so, any residual gas contained in the gas passageways 42 or 44 will not solidify and the open channel thus maintained throughout the nozzle housing will be ready for subsequent flow of gas therethrough.

The effectiveness of the nozzle described herein is substantially greater than that available with the prior designs. During the course of operation of the complete conversion system, it was found that during a time period of 18 months prior to the development of this invention, the hydrolysis column was out of operation for 756 hours. This down time was attributable to extreme deterioration of the prior art nozzle, which resulted from the corrosive atmosphere in which it operated, and to plugging of the nozzle because steam flow in the space between the two pipes varied during system performance.

After installation of the nozzle described herein it was found that over a period of approximately 7 months, there was no down time in the system. This remarkable improvement in operation is primarily attributable to the different method used for maintaing the uranium hexafluoride gas at a prescribed temperature. By conducting steam through the nozzle housing in a completely separate circuit from the gas process stream, eliminates the possibility of impurities from pipe corrosion entering the product stream. Also, it is possible to maintain the nozzle housing at a constant level and at a precise temperature, which completely eliminated the possibility of gas plugging in the nozzle; and it has been found that process temperature fluctuations are reduced.

It will be apparent that many modifications and variations are possible in light of the above teachings. It therefore is to be understood that within the scope of the appended claims, the invention may be practiced other than as specifically described.

I claim:

1. A hydrolysis column used in an ammonium diuranate conversion line process comprising:
    a column including a pipe having an inlet adapted for connection at one end to a source of water supply and having a discharge outlet at its other end;
    a cross-connection inserted in said pipe between said inlet and outlet;
    a gas nozzle comprising a housing connected to said cross-connection, said housing having a radially disposed passageway adapted for connection to a gas source and communicating with an axial passageway therein;
    a Teflon fitting removably connected to the discharge side of said axial passageway, said fitting having an axial duct therein positioned in alignment with said axial passageway, and being of a length sufficient to extend into said column so that gas flowing through said passageways and duct may be discharged directly into and blend with water flowing in said column;
    heating means in said nozzle housing, said nozzle housing being constructed and arranged to act as a heat sink so that heat imparted thereto by said heating means is substantially uniformly conducted thoughout the mass of said nozzle; and
    said heating means being sufficient to maintain the temperature of said housing at a level which precludes freezing of gas flowing therethrough.

2. The nozzle according to claim 1 wherein said heating means comprises fluid passageways in said housing, said passageways connecting with each other to form a closed circuit therein, thereby providing an unobstructed avenue for steam adapted to flow therethrough.

3. The nozzle according to claim 2 wherein the end of said axial passageway opposite from said fitting is equipped with a removable plug, whereby upon plug removal, the axial passageway and pipe may be inspected and cleaned as necessary, and
    piping means including a pump interconnecting the outlet of said column with said inlet for permitting the recirculation of liquid through said column.

* * * * *